April 18, 1939. W. E. LAWRENCE 2,154,460
VARIABLE SPEED TRANSMISSION MECHANISM
Filed April 14, 1933 2 Sheets—Sheet 1

INVENTOR.
William E. Lawrence
BY
Fay, Oberlin & Fay
ATTORNEYS

INVENTOR.
William E. Lawrence
BY
Fay, Oberlin & Fay
ATTORNEYS.

Patented Apr. 18, 1939

2,154,460

UNITED STATES PATENT OFFICE 2,154,460

VARIABLE SPEED TRANSMISSION MECHANISM

William E. Lawrence, Cleveland Heights, Ohio

Application April 14, 1933, Serial No. 666,163

38 Claims. (Cl. 74—293)

This invention relates to power-transmission mechanism, and more particularly mechanism for varying the ratio of transfer through a wide range permitting efficient usage of a source of power, itself of relatively limited variability; and it is among the objects of the invention to provide a construction which is largely automatic as to operating features while permitting desired volitional modification. Another object is a construction which affords a very flexible control and without resort to inconvenient expedients. Another object is the provision of a mechanism which is remarkably compact, rendering it particularly advantageous for such non-stationary usages also as automotive installations. A further object is the reduction of vibration stresses as would otherwise tend to be exaggerated in high-speed structures. Still another object is the adaptation of braking functions in the same elements. Other objects and advantages will appear as the description proceeds.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

Figure 1:
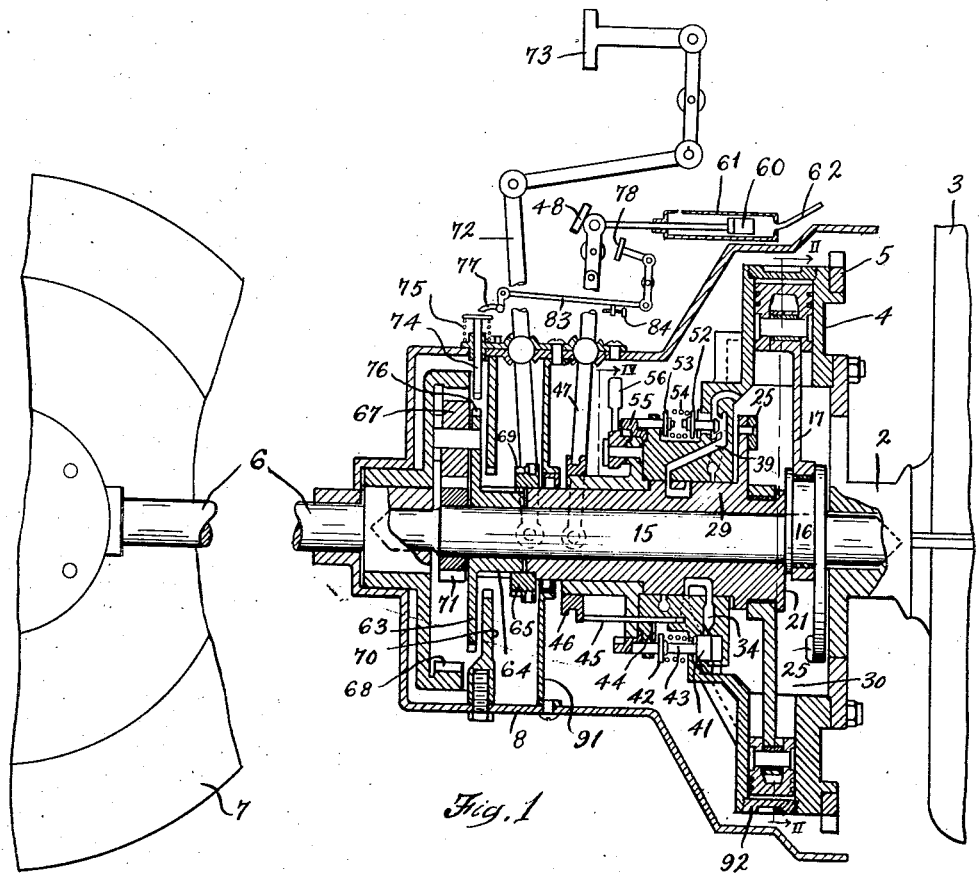
Figure 4:
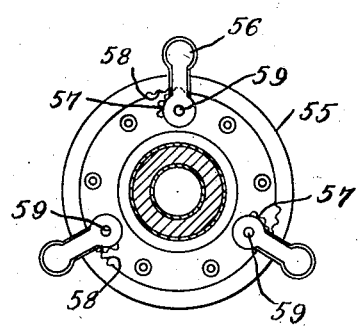
Figure 6:
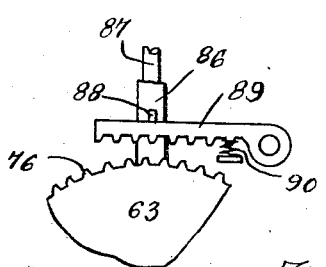
Figure 5:
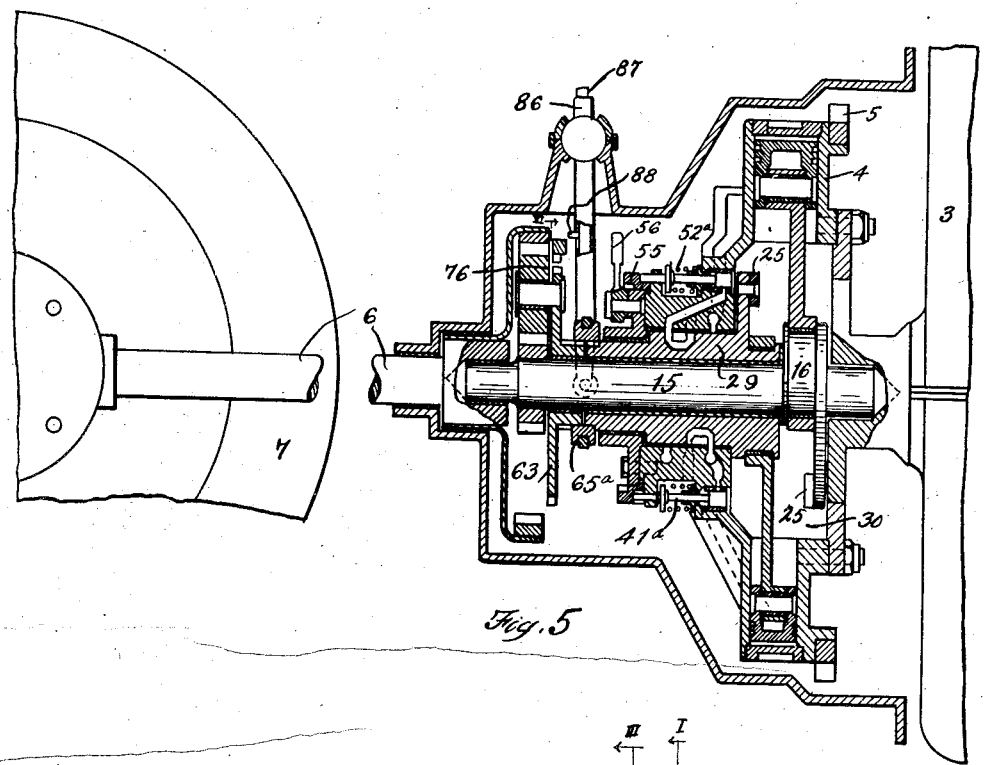
Figure 3:
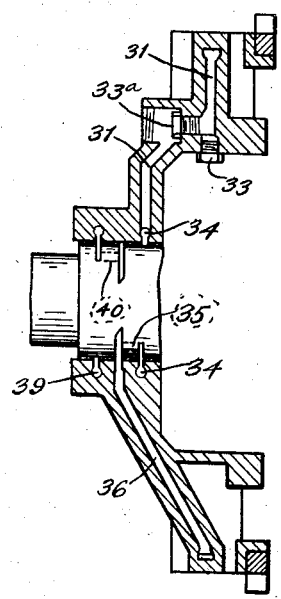
Figure 2:
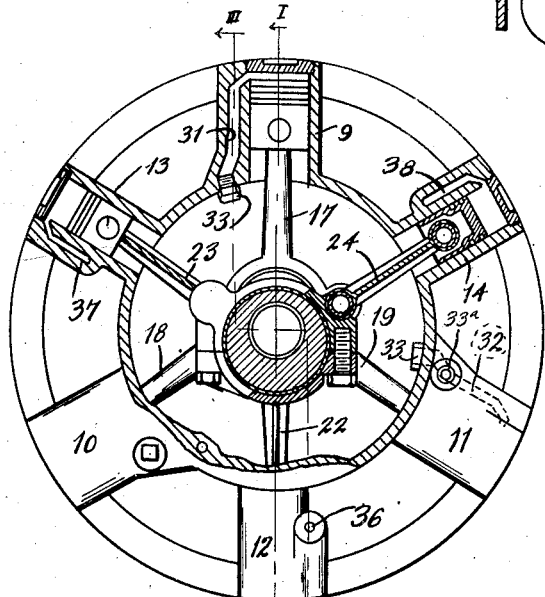

In said annexed drawings:

Fig. 1 is a vertical longitudinal sectional view of an embodiment of the invention; Fig. 2 is a transverse section taken on a plane substantially indicated by the line II—II, Fig. 1; Fig. 3 is a section taken on a plane substantially indicated by line III—III, Fig. 2; Fig. 4 is a section taken on a plane substantially indicated by line IV—IV, Fig. 1; Fig. 5 is a view analogous to Fig. 1 showing a modification; and Fig. 6 is a fragmentary section taken on a plane substantially indicated by line VI—VI, Fig. 5.

In Fig. 1 of the drawings there is shown an installation particularly illustrative of automotive usage, and embodying a driving shaft 2 from a source of power, as an internal combustion engine 3. Connected to the shaft 2 is a compressor or fluid-pump housing 4, within which are movable pumping elements of suitable character, rotary or piston as preferred, and in the form illustrated being pistons. By suitable proportioning of the pump housing, the customary flywheel in connection with internal combustion engine uses may be dispensed with, the pump-housing itself being adapted to this function; and a ring gear 5 for engagement with an engine starter may be conveniently applied directly to the housing. In line with the driving shaft 2 is a driven shaft 6, illustrated as a tail shaft of an automotive vehicle, connecting through suitable differential means to the wheels 7; and interposed between the driving shaft 2 and the driven shaft 6 is a transmission casing 8 containing intermediary transmission mechanism as will be detailed.

The pump housing is shown in Figs. 1–3 inclusive as having two sets of cylinders, one set 9, 10, 11, and another set 12, 13 and 14. The cylinders 9, 10, 11 are equipped with pistons, all of which connect, for operation by eccentric 16 on the transmission shaft 15, the respective connecting rods 17, 18, 19, being joined to the eccentric strap in common; and similarly the pistons of cylinders 12, 13, 14 are joined by their respective connecting rods 22, 23, 24 to an eccentric strap 21 in common. By setting the connecting rods in mis-match or stagger relation, a general planar alignment of the pistons may be maintained, and thrust-stresses properly aligned for desirable vibration-free operation. If further desired, this may be assisted also by counterweights 25 suitably positioned.

Extending from the eccentric 21 is a sleeve-shaft 29, and being rotatably or rather oscillably mounted between transmission shaft 15 and the extension of the housing 4 which carries certain valve-passageways and ports. One set of valve-passageways leads between the central sump or reservoir 30, and the cylinders 9, 10, 11, the passageways being ducts 31, 32, etc., being guarded next to the central sump by check valves 33, and communicating through check valves 33a with a pressure passage 34 in the valve-body extension of the housing 4, and the pressure passage 34 further communicating with pass-way 35 and communicating pass-ways in the sleeve-shaft 29. Similarly, ducts 36, 37, 38 communicate with the cylinders 12, 13, 14, the pressure-passages 39, and pass-ways 40. Interposed in the fluid-circuit to pass-way 34 is a valve 41 of any suitable or preferred type, shown illustratively as a slide-plug valve, and having an operating tappet, a spring 43 being interposed. Bearing against the valve tappet 42 is an operating member, as a cam in the form of a ring 55. The cam ring 55 is operated by weights 56 which are provided with rack-teeth 57 (Fig. 4) meshing in turn with teeth 58 on the interior of the ring, the weights being pivoted at 59, whereby on turn-over at a suitable rate, the outward swing of the weights tends to slightly turn the cam ring 55 and operate the valve tappets. A substantially straight-line proportion control of the resistance-interposing valve 41 as related to speed. A manual control, that is hand-operated or foot-operated, is also superposed, for instance a lug 44 on slide-rod 45. The latter is arranged in the path of a slide-collar 46, the fork thereof being illustrated as connected to a suitably mounted lever 47 having an operating pedal or the like 48 within convenient access of the operator. The passageway 34 is controlled by a valve 52, which may be operated by a tappet 53, a spring 54 being interposed, and the tappet in turn being controlled by the centrifugally-actuated cam ring 55 having a facial cam raise as for action upon the tappet 42.

In addition to the means already described for operation of the resistance-control valve 41, a form of control may also be superposed, such as a plunger 60 in a cylinder 61 which has a suction connection 62 to the engine, the plunger 60 being connected in turn to the operating lever 47, whereby when the engine speed and the consequent suction reaches a suitable amount, the control lever 47 and the resistance-interposing valve 41 may be operated thereby. In general, the valve 41 acts on the order of a clutch-release, and valve 52 modifies torque. Both are automatically controlled by the governor, and in addition valve 41 may be controlled manually or by the free-wheeling means 60, etc.

A variable transfer gear of suitable character, having idlers in a cage mounting, as of differential or epicyclic type is arranged between the transmission shaft 15 and the driven shaft 6, and may comprise a planetary casing 63 whose hub 64 is provided with splines or ribs cooperative with a slide-collar 65, a similar spline being available on the proximal end of the sleeve-shaft 29, whereby in suitable position, as in fact that illustrated in Fig. 1, the slide-collar 65 may lock the sleeve-shaft 29 and the planetary casing 63 into forward drive-engagement. Again, appropriate movement of the slide 48, as to the left of its position illustrated in Fig. 1, will release from the sleeve-shaft 29, and so on. The planetary casing 63 carries one or more idlers 67, which mesh in turn with ring gear 68 which is secured to the driven shaft 6.

The slide-collar 65 is provided also with projections or teeth 69, which when in a position sufficiently to the left of that illustrated in Fig. 1 will mesh with the internal teeth of a stationary engaging member 70 secured to the casing. That is, positioning of the slide-collar 65 to the extreme left-hand as referred to Fig. 1, would lock the planetary casing 63 to a standstill with the fixed member 70, thereby directing motion through the transmission shaft 15, its sun gear 71, idlers 67, external ring gear 68, and driven shaft 6, and of course at the same time disengaging from forward-drive connection with sleeve-shaft 29. A convenient operating means for the slide-collar 65 may involve for instance a lever 72 operated by a manual control 73 which may be positioned at some convenient point, as on the dash or steering column.

A braking control may take the form of a slide-pawl 74 normally maintained inactive by spring 75, but depressible to engage the teeth 76 on the planetary casing 63 if desired. For operating such pawl, a suitable lever-control 77 may be arranged with an actuating pedal or the like 78. Conveniently also, a common operation may be provided as between the braking-rod 83 and the collar-shifter 47. By an adjustable interconnection, as a lug and adjusting-screw 84 on the rod 83, operation of the pedal 78 may simultaneously throw the lever 47 into idling position.

It will be noted that the cylinders 9, 10, 11 are of unequal displacement to the cylinder-set 12, 13, 14, to which they are joined by conduit-system into a common circulation system. The ratio of these unequal capacities depends upon the desired measure of speed-increase to be obtained in forward motion, taken also in conjunction with the gear-ratio utilized in the planetary train for increase of speed in reverse motion.

Presuming a gear ratio to have been selected, such that for example the ring gear 68 is three times the circumference of the sun-gear 71, so that a multiplication of torque in reverse by three is obtained, a revolution of the planetary case 63 once to each four revolutions of the sun-gear 71 would result in no transmission of power to the ring gear 68 or driven-shaft 6. This may be called free run-around of the planetary case 63. If then the cylinders 12, 13, 14 were one fourth the displacement of the cylinders 9, 10, 11, circulation from the latter into the former would set up a rotation of the planetary case 63 equal exactly to free run-around, with no transmission of power. If however, the cylinders 12, 13, 14 are greater than one-fourth the cylinders 9, 10, 11 in fluid displacement, there is caused a rotation of planetary case 63 faster than free run-around, and this excess of rotation of the planetary case 63 caused by the cylinder ratio is imparted to a turning movement in forward motion to the ring-gear 68 and driven shaft 6, with an appropriate increase of speed predetermined according to the selected ratio of cylinder displacements. Thus for example, a ratio of the displacements of the cylinders 9, 10, 11 to the cylinders 12, 13, 14 of 8 to 3 may be selected, in order, using a planetary gear ratio of 3 to 1, to attain a multiplication of speed in forward motion of 3 to 1.

A suitable partition 91 with packing may be provided as a grease-barrier, permitting use of appropriate lubricants for the respective parts.

The operation of the transmission will be readily apparent from the foregoing. With the engine shaft 2 turning, the pump housing 4 is also correspondingly revolved, while the pistons in the cylinders are caused to reciprocate reactively, and occasion a circulation of the fluid, which may be any convenient pressure-fluid, for example oil. The normal circuit, with the valve 52 open and valve 41 closed, would be from the central sump or reservoir through the pressure ducts 34 and 39. Supposing the valve 41 to have been opened by action of the governor weights 56 upon the ring 55 at slow motor turn-over, or by control of pedal 48 or suction plunger 60, the fluid circulation out of cylinders 9, 10 and 11 is shunted or by-passed from the conduit 34 into the sump 30, and the fluid pressure being thus relieved, the planetary gear train remains inactive.

Supposing the valve 41 to be brought to closure by action of the governor weights 56 at increasing motor speed, the induced circulation out of cylinders 9, 10 and 11 passes over into the cylinders 12, 13 and 14, so that a forward drive with speed multiplication as above described is exerted through sleeve-shaft 29 and slide collar 65 upon planetary case 63 and driven shaft 6. When however, the resistance-interposing valve 52 is also moved toward closing position, a corresponding amount of retardation is imposed in the fluid circuit, and instead of the pump housing turning relative to the pump-elements in proportion to their constrained reciprocations, the ratio of differential movement is correspondingly narrowed, and if the valve 41 be completely closed, all fluid slippage is terminated, all reciprocation ceases, and the pump elements and casing revolve together. That is, the sleeve-shaft 29 and transmission shaft 15, together with the sun gear 71, planetary case 63, ring gear 68 and driven shaft 6, will then all turn at the same speed as the shaft 2. In such manner, by varying the extent of opening or rather closing of the valve 52, the amount of fluid-slippage and the particular ratio of relative movement between pump casing and pump elements may be automatically governed by the motor turn-over-rate without further voluntary act of the operator. At increasing motor speed, centrifugal movement by the weights causes a rotational movement of the ring 55 and its cam-raise thrusts the tappet 53, compressing the coil spring 54 and exerting a closing pressure on the valve 52 against the direction of fluid-pressure in conduit 34. By such means excess vehicle load as in starting, accelerating or ascending grades will not set up a reaction to retard the motor turnover rate, but instead the increased fluid pressure may operate through the valve upon the cam to retain the outward fly of the governor weights. Also, safety slippage of fluid at excess pressure is permitted against the compression of the valve spring. In the manual control of the valve 41, the operating lever 47 may be employed to retain the valve 41 open at will with release of fluid pressure and consequent power transmission at such advanced motor speeds as would otherwise by governor action cause the closure of valve 41. By reason of the connection to the engine through the suction line 62, a similar release of fluid pressure with automatic free wheeling may also be had. With the lever 72 set in an approximately vertical position, with reference to Fig. 1, the slide-collar 65 will be in a position just wholly upon the hub 64 of the planetary casing, and clear of the internal teeth of the stationary member 70, and correspondingly in neutral position. Shifting of the collar 65 into the forward or right-hand position, as it is shown in Fig. 1, locks the sleeve-shaft 29 to the hub 64 of the planetary casing and the latter turns in step with the former, occasioning forward movement of the vehicle when valve 41 is closed. The speed is governed, as above-indicated by the extent of slippage permitted by the valve 52 as determined by the set maintained therefor by action of the governor weights 56. When the member 72 is shifted such that the slide-collar 65 is at its extreme rear or left-hand position, referring to Fig. 1, the sleeve-shaft 29 is no longer engaged, but the hub 64 of the planetary casing 65 is locked to a standstill to the housing-member 70, and when increased motor speed causes closure of the valves 41 and 52 the shaft 15 then transmits through its sun gear 71, the idlers 67, the internal ring gear 68, and the tail shaft 6, with reverse motion of the vehicle. The torque is determined by the ratio of the sun gear 71 to the ring gear 68. For braking, operation of the pedal 73 will set the pawl 74 into engagement with the teeth 76 of the planetary casing, thereby holding the latter to a standstill, and occasioning a thrust through shaft 15, its sun gear 71, idlers 67, internal ring gear 68, and shaft 6 in an obverse or retarding sense, at a pressure of fluid modulated by partial opening of the valve 41, adjusted to a degree sufficient to retard the vehicle, without stalling the motor or damaging the transmission.

In Fig. 5 there is shown a modification wherein for greater simplicity and compactness, auxiliary controls have been eliminated. There is also shown the operation of the sliding collar 65a by a manual shift lever 86, operating on a raised ball socket somewhat as in conventional gear shift design. Another form of reverse is shown, whereby on the sliding collar 65a being moved to the left, depression of the inner slide rod 87 and its lug 88 depresses the ratchet 89 against the retaining spring 90, to engage the external teeth 76 of the planetary case 64, causing standstill of the case and reverse motion of vehicle. Suitable detent means may be provided for the upper end of slide rod 87, as need not be further shown.

There is also shown a simplification of the valve 52a, the valve stem operating directly against the facial cam of the ring 55 without intervening compression tappet, and with also a more direct conduit return into sump 30.

In the form shown in Fig. 5, not only is space saved by the elimination of auxiliary controls, but there is also indicated an arrangement whereby, except for the neutral and reversing operation of the shift lever 86 and lug 88, all control including clutch release at the valve 41a and torque-modification by the valve 52a is attained automatically by the centrifugal force of the weights 56, by no other act of the operator than throttle control of the motor 3.

In its features of compactness, the construction is thus seen to be particularly well adaptable for automotive application, where space requirements are of such prime importance. Moreover, the proportioning and balance may be such that vibration-moments, as customarily expected from masses of metal revolving at high speed, may be obviated. By arranging the cylinders 9, 10, 11, 12, 13, 14, and the valves 33a with screw-threaded closures 92, access to the cylinders and valves may be had very simply and conveniently as occasion requires. The particular number of cylinders may obviously be varied within the limits of requirements as determined by any given set of conditions.

Other modes of applying the principle of the invention may be employed, change being made as regards the details described, provided the means stated in any of the following claims, or the equivalent of such, be employed.

I therefore particularly point out and distinctly claim as my invention:

1. In drive mechanism, shafts to be connected, and means for connecting said shafts including two sets of pump-pistons radially interspaced, and means for controlling one set independently variable of the other.

2. In drive mechanism, shafts to be connected, and means for connecting said shafts including two sets of pump-pistons in a common plane and a separate actuating means independently variable for each such set.

3. In drive mechanism, shafts to be connected, means for connecting said shafts including gearing and fluid-pump elements, valve means for controlling the pump elements, annular means for operating said valve means, gear teeth on said annular means, and centrifugally-actuated weights having teeth controlling said annular means.

4. In drive mechanism, shafts to be connected, a gear on each shaft, an idler and a revoluble idler-carrying means between said gears, fluid-pump means connected in part to one of said shafts and in part to a driving means, said pump means being in two sets each having its own central actuating means, and means for locking the revoluble idler-carrying means to a standstill.

5. In drive mechanism, a driving shaft, a driven shaft, fluid-pump means having a housing connectible to one said shaft, movable pumping elements connectible to the other shaft, a sleeve-shaft adjacent said pump housing, a variable gear positioned between said sleeve-shaft and said driven shaft, and a slide collar splineably engageable onto said sleeve-shaft and said variable gear as desired.

6. In drive mechanism, a driving shaft, a driven shaft, fluid-pump means having a housing connectible to one said shaft, movable pumping elements connectible to the other shaft, a sleeve-shaft adjacent said pump housing, an idler-carrying gear casing, a ring gear meshable with the idler gears of said casing and connected to said driven shaft, and a slide-collar splineably engageable with said sleeve-shaft and said idler-carrying casing at will.

7. In drive mechanism, shafts to be connected, a gear on each shaft, an idler and a revoluble idler-carrying means between said gears, fluid-pump means connected in part to a driving means, a sleeve-shaft about said last-mentioned shaft, and means for locking the revoluble idler-carrying means to said sleeve-shaft.

8. In drive mechanism, a casing, shafts to be connected, a gear on each shaft, an idler and a revoluble idler-carrying means between said gears, fluid-pump means connected in part to one of said shafts and in part to a driving means, and a slide-collar for locking the revoluble idler-carrying means to the housing.

9. In drive mechanism, a casing, shafts to be connected, a gear on each shaft, an idler and a revoluble idler-carrying means between said gears, fluid-pump means connected in part to one of said shafts and in part to a driving means, a ribbed hub on said revoluble idler-carrying means, stationary reaction rib-means aligned generally with said ribbed hub, and a slide-collar adapted to be moved into engagement with the ribbed hub and said aligned stationary reaction rib-means.

10. In drive mechanism, a casing, shafts to be connected, a gear on each shaft, an idler and a revoluble idler-carrying means between said gears, fluid-pump means connected in part to one of said shafts and in part to a driving means, a sleeve-shaft about said last-mentioned shaft, a ribbed hub on said revoluble idler-carrying means, and a slide-collar adapted to optionally engage the sleeve-shaft with the revoluble idler-carrying means or the ribbed hub alone.

11. In drive mechanism, a casing, shafts to be connected, a gear on each shaft, an idler and a revoluble idler-carrying means between said gears, fluid-pump means connected in part to one of said shafts and in part to a driving means, a sleeve-shaft about said last-mentioned shaft, a ribbed hub on said revoluble idler-carrying means, aligned ribs projecting in from the casing, and a slide-collar adapted to optionally engage the sleeve-shaft with the revoluble idler-carrying means or the ribbed hub and the ribs projecting in from the casing.

12. In drive mechanism, a casing, shafts to be connected, a gear on each shaft, an idler and a revoluble idler-carrying means between said gears, fluid-pump means connected in part to one of said shafts and in part to a driving means, and a pawl mounted to rock from the casing to the revoluble idler-carrying means.

13. In drive mechanism, a casing, shafts to be connected, a gear on each shaft, an idler and a revoluble idler-carrying means between said gears, fluid-pump means connected in part to one of said shafts and in part to a driving means, a pawl mounted to rock from the casing to the revoluble idler-carrying means, and a pedal for operating said pawl.

14. In drive mechanism, shafts to be connected, a gear on each shaft, an idler and a revoluble idler-carrying means between said gears, fluid-pump means connected in part to one of said shafts and in part to a driving means, said pump means being in two sets each having its own central actuating means, a resistance-interposing valve in the fluid circuit of said pump means, and manually-controlled means for operating said valve.

15. In drive mechanism, shafts to be connected, a gear on each shaft, an idler and a revoluble idler-carrying means between said gears, fluid-pump means connected in part to one of said shafts and in part to a driving means, said pump means being in two sets each having its own central actuating means, a resistance-interposing valve in the fluid circuit of said pump means, manually controlled means for operating said valve, and a centrifugal-control also operating upon said valve.

16. In drive mechanism, shafts to be connected, a gear on each shaft, an idler and a revoluble idler-carrying means between said gears, fluid-pump means having a housing connectable to one of said shafts and two sets of movable elements connectable by aid of said gears to the other shaft, a resistance-interposing valve in the fluid-circuit of each set of movable elements, and respective controls for said valves.

17. In drive mechanism, shafts to be connected, a gear on each shaft, an idler and a revoluble idler-carrying means between said gears, fluid-pump means having a housing connectable to one of said shafts, and speed ratio reduction means including two sets of movable elements connectable by aid of said gears to the other shaft, one set of movable elements being of greater effective capacity than the other set.

18. In drive mechanism, a driving shaft, a driven shaft, fluid-pump means having a housing connectable to one said shaft, movable pumping elements connectable to the other shaft, a sleeve-shaft adjacent said pump housing, valve passages in said housing and sleeve-shaft, a clutch-release valve and a speed increasing valve controlling such passages, means for controlling said valves, a variable gear positioned between said sleeve-shaft and said driven shaft, and means for controlling the connection between said sleeve-shaft and driven shaft.

19. In drive mechanism, a driving shaft, a driven shaft, fluid-pump means having a housing connectable to one said shaft, movable pumping elements connectable to the other shaft, a sleeve-shaft adjacent said pump housing, valve passages in said housing and sleeve-shaft, a clutch-release valve and a speed increasing valve controlling such passages, means for controlling said valves, a variable gear positioned between said sleeve-shaft and said driven shaft, and a slide-collar splineably engageable onto said sleeve-shaft and said variable gear as desired.

20. In drive mechanism, shafts to be connected, means for connecting said shafts including two independently variable sets of pump pistons in a common plane, and a multiple connecting rod for each set, said multiple connecting rods being offset with respect to each other.

21. In drive mechanism, shafts to be connected, means for connecting said shafts including gearing and two sets of pump cylinders with pistons actuated by separate shafts, conduits inter-connecting said sets of pump cylinders, and valves to control recirculation, said valves including automatic uni-directional flow control means from one pump set and timed intake and exhaust control means upon the other pump set.

22. In drive mechanism, shafts to be connected, means for connecting said shafts including gearing and two sets of pump cylinders with pistons actuated by separate shafts, conduits inter-connecting said sets of pump cylinders, valves to control recirculation, said valves including automatic uni-directional flow control means from one pump set and timed intake and exhaust control means upon the other pump set, stoppage valves to prevent said recirculation, and manual and centrifugal means to control said stoppage valves.

23. In drive mechanism, shafts to be connected, means for connecting said shafts including gearing and two sets of radially inter-spaced pump cylinders with pistons actuated by separate shafts, conduits inter-connecting said sets of pump cylinders, and valves to control recirculation, said valves including automatic uni-directional flow control means from one pump set and timed intake and exhaust control means upon the other pump set.

24. In drive mechanism, shafts to be connected, means for connecting said shafts including gearing and two sets of pump cylinders in a common plane with pistons actuated by separate shafts, conduits inter-connecting said sets of pump cylinders, and valves to control recirculation, said valves including automatic uni-directional flow control means from one pump set and timed intake and exhaust control means upon the other pump set.

25. In drive mechanism, shafts to be connected and means for connecting said shafts including two sets of pump-pistons radially inter-spaced, and separate actuating means connected to separate shafts for each such set.

26. Drive mechanism of the character described, comprising a drive shaft, a driven shaft, a transfer gear between drive shaft and driven shaft capable of variable movement, fluid pressure-means for retarding movement of said transfer gear, manually-operated means for controlling the retarding movement, centrifugally-operated means for controlling the retarding movement, and vacuum-operated means for also controlling the retarding movement.

27. In drive mechanism, shafts to be connected, and means for connecting said shafts including two sets of pump-pistons in substantially a common plane, a multiple connecting rod for each set, and means for controlling one set independently variable of the other.

28. In drive mechanism, shafts to be connected, and means for connecting said shafts, comprising two sets of pump-means including cylinders, said pump-means being independently and centrally connectable to said shafts and the cylinders being radially interspaced in substantially a common plane.

29. In drive mechanism, shafts to be connected and means for connecting said shafts and for increasing torque-ratio, said means including gear elements connected to separate shafts, two sets of pump elements including cylinders in substantially a common plane, one set of cylinders having greater capacity than the other, conduits connecting the two sets of pump elements, and variable means to control recirculation therethrough.

30. In drive mechanism, shafts to be connected, means for connecting said shafts including radially-arranged pump pistons and cylinders, inter-connecting conduits for said cylinders, valves controlling said conduits, and vacuum means to control said valves.

31. Drive mechanism of the character described, comprising a drive shaft, a driven shaft, radially-arranged fluid-pressure pistons for variably transferring movement between said drive shaft and said driven shaft, manually-operated means for controlling said fluid-pressure pistons, and vacuum-operated means for also controlling the fluid-pressure pistons.

32. Drive mechanism of the character described, comprising a drive shaft, a driven shaft, a transfer gear between drive shaft and driven shaft capable of variable movement, radially-arranged fluid pressure pistons for retarding movement of said transfer gear, manually operated means for controlling the retarding movement, and vacuum-operated means for also controlling the retarding movement.

33. Drive mechanism of the character described, comprising a drive shaft, a driven shaft, a transfer gear between drive shaft and driven shaft capable of variable movement, radially-arranged fluid pressure pump pistons connected to said transfer gear, means for varying the resistance imposed on said pump pistons, manually-operated means for controlling such resistance, and vacuum-operated means for also controlling the same.

34. In drive mechanism, shafts to be connected, means for connecting said shafts including gearing and fluid-pump elements, valves for controlling said pump elements and having valve stems in general parallel to said shafts, a cam ring for operating said valves, gear teeth on said cam ring, centrifugal weights having teeth meshing with the gear teeth on said cam ring, and cam-surfaces on the face of said cam ring engaging the stems of said valves.

35. In drive mechanism, shafts to be connected, means for connecting said shafts including gearing and fluid-pump elements, valve means for controlling the pump elements, and means for operating said valve means, including a cam ring, centrifugal weights for actuating said cam ring, and facial cam-surfaces on said cam ring coacting with said valve means.

36. In drive mechanism, shafts to be connected, means for connecting said shafts including radially-arranged pump pistons and cylinders, inter-connecting conduits for said cylinders, valves controlling said conduits, and valve-operating means including a control lever and a vacuum-operated means operating upon said lever.

37. In drive mechanism, shafts to be connected, means for connecting said shafts including two sets of pump pistons in a common plane, eccentric means for operating one of said sets, and counter-balancing means integral with said eccentric means.

38. In drive mechanism, shafts to be connected, means for connecting said shafts including two sets of pump pistons in a common plane, eccentric means for operating one of said sets, and a pump housing for said pump pistons acting as a fly-wheel.

WILLIAM E. LAWRENCE.